3,103,132
DIFFERENTIAL ASSEMBLY
Robert W. Burton, Farmington, Mich., assignor to General Motors Corporation, Detroit, Mich., a corporation of Delaware
Filed May 1, 1961, Ser. No. 106,793
2 Claims. (Cl. 74—607)

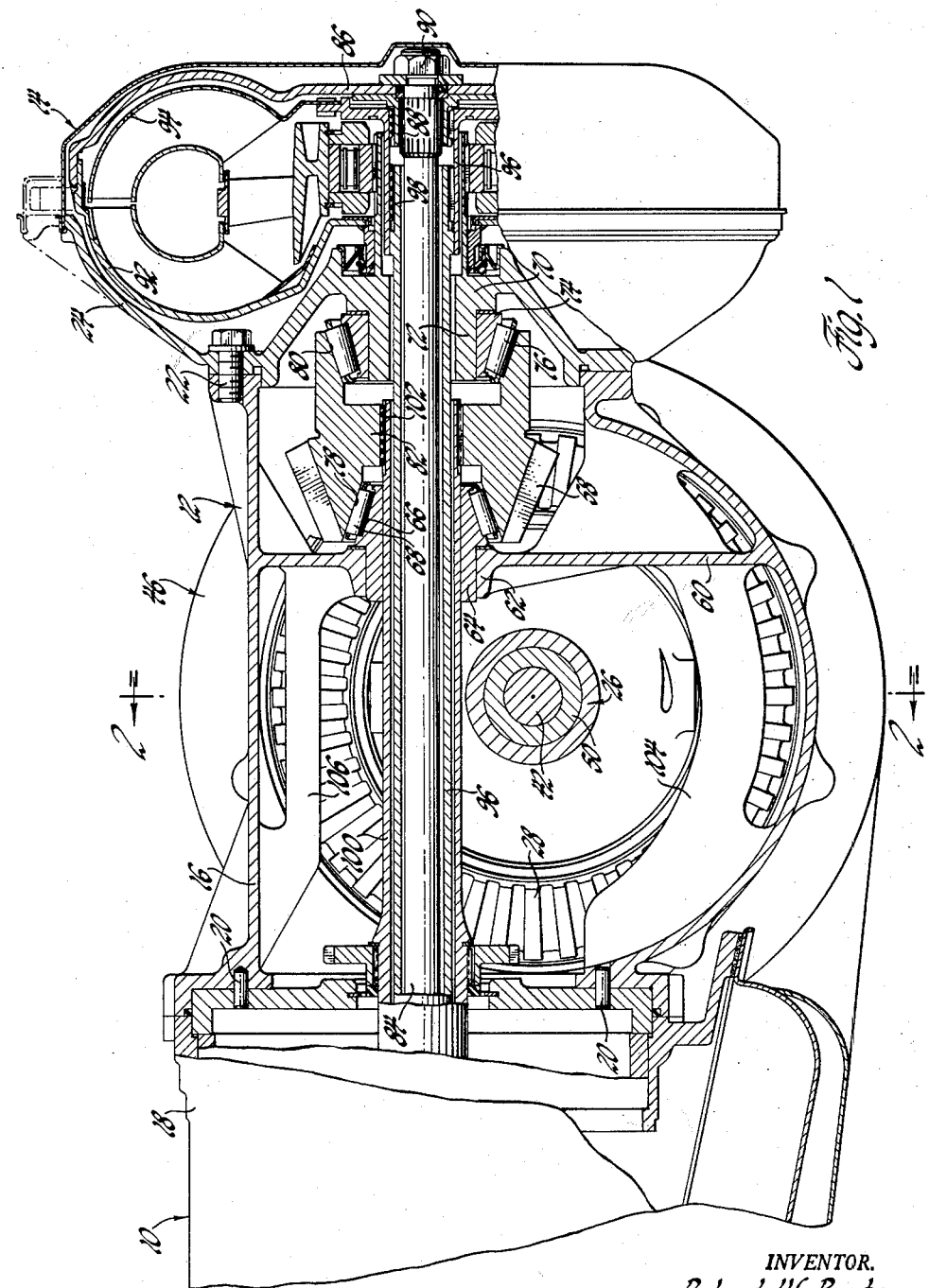

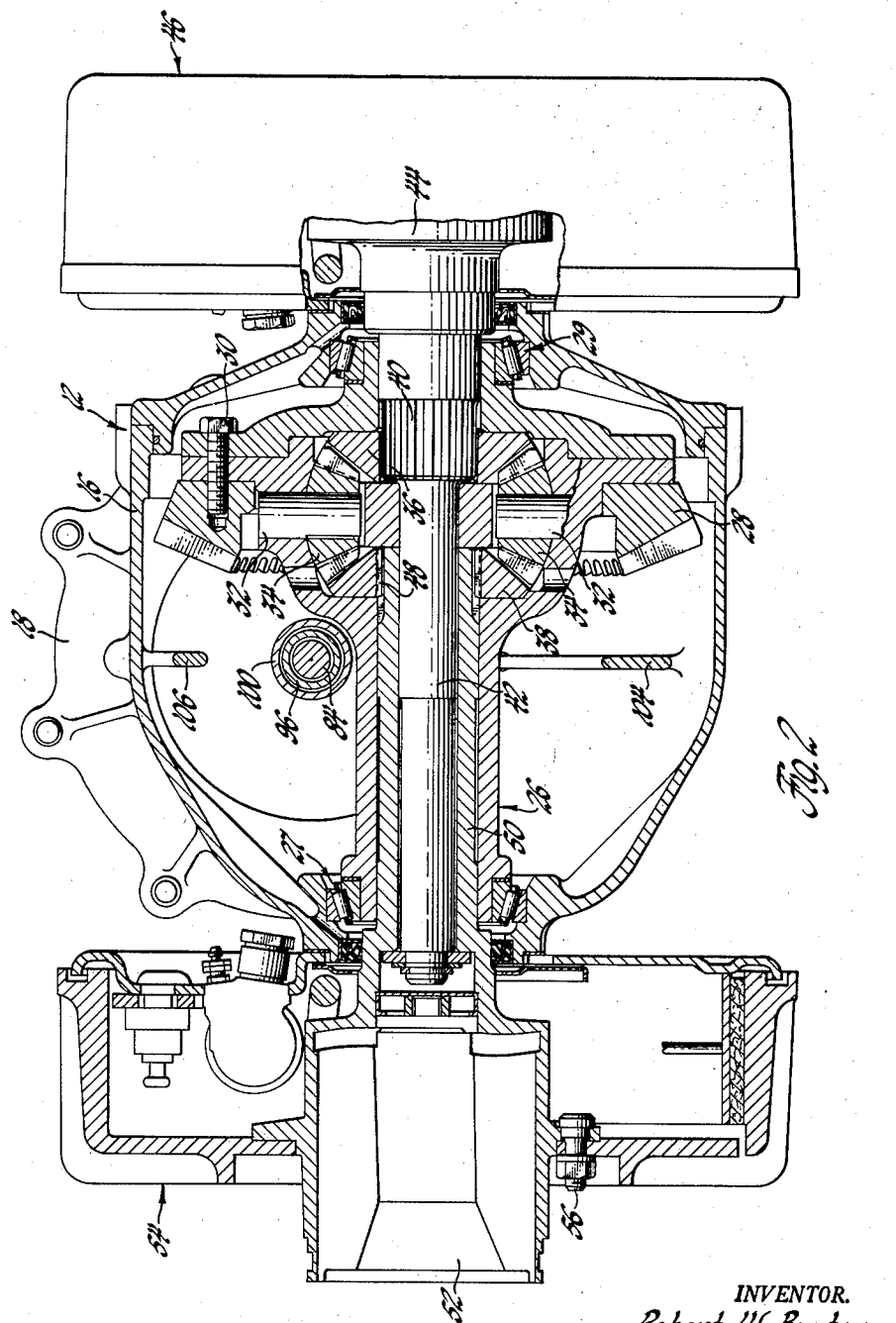

This invention relates to differential assemblies for motor vehicles, and more particularly to a means for supporting a pinion gear in the differential assembly housing.

In the design and manufacture of motor vehicles it is becoming more and more popular to place the transmission at the rear of the vehicle to obtain better drive and suspension for the vehicle. When using a transmission and torque converter assembly it may be desirable to place the torque converter to the rear of the differential and the transmission in front of the differential. The differential is usually placed immediately in the line of the rear axle. This creates numerous problems, getting power to the differential assembly and to the rear axle. It might require complicated gearing and linkage systems, or other complex and expensive devices, to provide this result.

The device in which this invention is embodied comprises, generally, a differential unit located between the transmission and the torque converter of the vehicle. The drive from the propeller shaft to the torque converter, and from the torque converter to the transmission gear case, and from the transmission gear case to the differential gear assembly, is all in a single line and accomplished by means of coaxial shafts. This requires the differential drive pinion to be supported around the coaxial shafts and to still be supported in a proper manner. To accomplish this, a web may be placed transversely of the differential unit and in the housing, having a bushing or the like adapted to support one end of the pinion gear, and a suitable construction provided for supporting the rear end of the pinion gear. This provides a relatively simple and uncomplicated construction of the transmission torque converter and differential assembly. The power train is direct, and losses due to numerous gears, universal joints and linkage systems are not present.

These and other advantages will become more apparent from the following description and drawings, in which:

FIGURE 1 is an elevational view of the portion of a motor vehicle including the transmission, differential and torque converter assemblies, with parts broken away and in section to illustrate the position of the various parts; and FIGURE 2 is a cross-sectional view of the construction illustrated in FIGURE 1 taken substantially along the line 2—2 of FIGURE 1 and looking in the direction of the arrows.

Referring more particularly to the drawings, the final drive of the vehicle is there illustrated. A transmission assembly, illustrated generally by the numeral 10, a differential assembly 12, and a torque converter assembly 14 are aligned at the rear of the vehicle and straddle the position of the rear axle. The transmission may be of any general construction and contains the usual gears and the like which are not shown. The differential unit 12 is partially of conventional construction and will be more fully described below. The torque converter 14 may also be of conventional construction.

The differential unit 12 is shown to include a housing 16 secured at one end to the transmission assembly housing 18 in any suitable manner and located by means of dowel pins or the like 20. Housing 16 is bolted by bolts 22 to the torque converter housing 24 to close the housing at that end. Suitable seals or the like may be provided where necessary.

Within the housing 16 of the differential assembly 12 is a carrier, illustrated generally by the numeral 26, to which is secured a ring gear 28 in some suitable manner, as by bolts 30. Carrier 26 is supported in the housing 16 by bearing assemblies 27 and 29. Crosspins 32 are secured in the carrier 26 and have differential gears 34 rotatably mounted thereon. Differential gears 34 engage side gears 36 and 38 in the normal manner. Side gear 36 is spline-connected, as at 40, to a cross shaft 42 extending transversely of the housing and having a connection to the axle. This connection may take the form of a universal joint housing 44. Housing 44 may also receive the rotating portions of the inboard brake assembly, illustrated generally by the numeral 46.

Differential side gear 38 is spline-connected, as at 48, to a cross sleeve 50 coaxial with cross shaft 42 and extending to a universal joint housing 52 serving as a connection between the sleeve 50 and the associated axle shaft. The rotating parts of inboard brake assembly 54 may be secured to housing 52 in any suitable manner, as by the nut and bolt assembly illustrated at 56.

It is necessary in the operation of the differential assembly 12 to have a pinion gear engaging the ring gear 28 to drive the carrier and side gears. Pinion gear 58 serves this purpose. Housing 16 is provided with a transverse web 60 spaced from the end of the torque converter housing 24 and having an inner flange 62 formed thereon. Flange 62 serves as a mounting for a bushing 64 which is provided with an annular tapered surface 66. Surface 66 receives an annulus of roller bearings 68. Torque converter housing 24 is provided with a projection 70 extending toward the transverse web 60 and having a step 72 adapted to receive an annular inner bearing race 74. Race 74 receives an annulus of roller bearings 76. Pinion gear 58 is provided with a series of stepped bores which include an annular inclined surface 78 acting as an outer race for the bearing annulus 68. A second annular inclined surface 80 is provided at the rear end of power bearing 58 and serves as an outer race for bearing annulus 76. Intermediate the inclined surfaces 78 and 80 is a flange 82 which provides means for driving the pinion gear and, in turn, driving the ring gear 28 and carrier 26.

In order to drive the differential gear carrier and thus the axles of the vehicle, a propeller shaft, not shown, extends from the engine and through the transmission 10. This may terminate in a separate shaft, as shaft 84, or shaft 84 may be a portion of the usual propeller shaft. Shaft 84 extends through the differential unit 12 and the torque converter 14 and, at its rearward end, is secured to the torque converter 86 in any suitable manner, as by splines 88 and nut 90. Cover 86 is attached in the usual manner to the torque converter impeller 92 which drives the turbine 94, the turbine being connected to a sleeve 96, as by splines 98. Sleeve 96 extends coaxially of shaft 84 and returns the drive to the transmission assembly 10. Suitable gearing is provided which eventually returns the power transmission to outer sleeve 100, coaxial with shaft 84 and intermediate sleeve 96. Sleeve 100 is spline-connected, as at 102, to the flange 82 within the drive pinion 58 of the differential assembly 12. Thus, it is seen that the power from the propeller shaft passes first through the torque converter 14, is returned to the transmission assembly 10, and again reversed to the drive pinion 58, which in turn rotates the carrier 26 through the ring gear 28. Carrier 26, through the differential gears 34 and side gears 36 and 38, drive the axle shafts of the vehicle.

Web 60 of the differential assembly housing 16 may be provided with longitudinal strengthening ribs 104 and 106 if such is necessary. It is to be noted that differential drive pinion 58 is coaxial with the drive shafts and sleeves and also is provided with portions acting as the outer races of the supporting bearing assembly.

Thus, a construction is provided which makes it feasible to separate the transmission assembly and torque converter of a vehicle drive and place these assemblies at opposite ends of the differential assembly. This provides for better balance of the vehicle without a loss of efficiency or power transmission due to completed linkages, gears and other drive transmitting devices.

What is claimed is:

1. A differential assembly for a motor vehicle having axle shafts and drive means and comprising a housing, a shaft extending transversely of said housing and adapted to engage an axle shaft, a side gear mounted on said shaft, a sleeve coaxial with said shaft and extending transversely of said housing and partially along the length of said shaft, said sleeve being adapted to engage another axle shaft, a side gear mounted on said sleeve and spaced from said first mentioned side gear, a carrier in said housing, crosspins mounted in said carrier and normal to said shaft, a pair of differential gears mounted, respectively, on said crosspins in spaced relation and engaging each of said side gears, a ring gear mounted on said carrier, an end plate closing said housing and having a projection thereon extending into said housing, a transverse web in said housing and axially spaced from said end plate, a bushing secured in said transverse web and extending into said housing and axially aligned with said projection on said end plate, a bearing inner race mounted on said projection and a bearing inner race mounted on said bushing, a plurality of roller members disposed about each of said bearing inner races, and a pinion gear having a bore therethrough received over each of said pluralities of roller members and extending between said transverse web and said end plate, and means in said bore in said pinion gear for receiving the drive means for said motor vehicle, said pinion gear engaging said ring gear and being adapted to drive said ring gear and said carrier and said crosspin and said side gears to drive said shaft and said sleeve for driving the axle shafts of said motor vehicle.

2. In a differential assembly including a housing having an end plate and a transverse web axially spaced from said end plate and a ring gear and carrier assembly and drive means therefor in said housing, a pinion gear and support comprising an annular protuberance extending from said end plate and toward said transverse web, a second annular protuberance extending from said transverse web and toward said end plate, a bearing inner race mounted on the outer surface of each of said protuberances and having a set of bearing members received therearound, a pinion gear extending between said transverse web and said end plate and having an axial bore therethrough, said pinion gear receiving and directly engaging said bearing members at each end thereof, said pinion gear and said protuberances being axially disposed and receiving therethrough a portion of the drive means for said ring gear and carrier assembly, and means in said bore and intermediate said sets of bearing members for driving said pinion gear and operating said differential assembly.

References Cited in the file of this patent

UNITED STATES PATENTS

| 1,574,047 | Midboe | Feb. 23, 1926 |
| 1,955,824 | Mogford et al. | Apr. 24, 1934 |
| 2,478,180 | Buckendale | Aug. 9, 1949 |
| 2,557,937 | Buckendale | June 26, 1951 |
| 2,645,299 | Vincent | July 14, 1953 |

FOREIGN PATENTS

| 461,947 | Great Britain | Feb. 26, 1937 |